United States Patent [19]

Hashizume et al.

[11] 3,757,309

[45] Sept. 4, 1973

[54] ENCODER DEVICE FOR RECORDING DATA ON A MAGNETIC TAPE

[75] Inventors: Tsuneharu Hashizume, Suwa-gun, Nagano; Michihiko Sasaki, Okaya-shi, Nagano; Masanori Tatuno, Suwa-gun, Nagano; Toshiaki Demachi, Suwa-gun, Nagano; Osamu Hatakoshi, Suwa-shi, Nagano; Shigeru Miyauchi, Suwa-gun, Nagano; Susumu Amemiya, Suwa-gun, Nagano, all of Japan

[73] Assignee: Kabushiki Kaisha Sankyo Seiki Seisakusho, Suma-gun, Nagano-ken, Japan

[22] Filed: Dec. 13, 1971

[21] Appl. No.: 207,210

[30] Foreign Application Priority Data

Dec. 14, 1970 Japan .............................. 45/110382

[52] U.S. Cl...... 340/172.5, 346/74 M, 340/174.1 G, 340/347 DD

[51] Int. Cl. .............................................. G06f 1/00

[58] Field of Search ............. 340/174.1 G, 347 DD, 340/172.5; 346/74 M; 178/66

[56] References Cited

UNITED STATES PATENTS

| | | | |
|---|---|---|---|
| 3,413,624 | 11/1968 | Murdoch et al | 346/74 M |
| 3,573,766 | 4/1971 | Perkins, Jr. | 340/347 DD |
| 3,330,909 | 6/1967 | Willson | 178/66 X |
| 3,354,463 | 11/1967 | Larsen | 346/74 M |
| 3,622,885 | 11/1971 | Kruszynski et al | 178/66 |
| 3,634,855 | 1/1972 | Miller | 340/174.1 G X |

*Primary Examiner*—Charles D. Miller
*Attorney*—John J. McGlew et al.

[57] ABSTRACT

In the device, data characters to be recorded on a magnetic tape are converted into decimal numbers in code form by an encoder circuit and stored in a block unit in a memory circuit, and the stored encoded data characters are fed by shift pulses produced by a synchronizing pulse producing circuit to an output control circuit where output gates of oscillators having oscillation frequencies set in accord with the weight of the encoded decimal numbers are controlled by the state of the bits of the data characters fed to this circuit, so that the data characters can be recorded serially and successively in the form of mixed frequency signal pulses including the frequencies in accord with the state of the bits for each character.

4 Claims, 8 Drawing Figures

ENCODER DEVICE FOR RECORDING DATA ON A MAGNETIC TAPE

BACKGROUND OF THE INVENTION

This invention relates to a data encoder device having particular utility in encoding data of numerical information and the like when such data is to be recorded on a magnetic tape.

Heretofore, when data of numerical information and the like is transmitted by utilizing a telephone circuit and the like, it has been customary to modulate the carrier wave by data signals and feed the modulated carrier wave to the telephone circuit or other transmission system. However, the practice of utilizing the transmission systems has had a disadvantage in that data errors are caused by various noises produced in the systems.

On the other hand, a data transmitting and receiving system has been proposed in which data of numerical information and the like is encoded and recorded on a magnetic tape used as a recording medium, the encoded data on the magnetic tape is automatically transmitted to a magnetic tape on the receiver side by utilizing a telephone circuit or other transmission system, and the data on the magnetic tape on the receiver side is reproduced and printed through a decoder and a typewriter. The use of this system permits to eliminate the aforementioned disadvantage of conventional systems for transmitting data by means of telephone circuit and the like.

This invention provides an encoder device for recording data on a magnetic tape which has particular utility in the aforementioned data transmitting and receiving system.

SUMMARY OF THE INVENTION

The objective of this invention is to provide a data encoder device which has particularly utility in directly feeding reproduced signals of the data recorded on a magnetic tape to a telephone circuit or other transmission system and receiving and recording such signals on a magnetic tape on the receiver side.

According to this invention, data in a block unit or data of eight characters for each block, for example, encoded, by operating an encoder circuit by depressing keys of a keyboard, into binary digits of an 8-4-2-1 code are stored in shift registers, of the serial signal type of a memory circuit. Simultaneously as a tape start key of the device is depressed to initiate the movement of a magnetic tape of a magnetic tape recorder connected to this device, shift pulses are produced by a synchronizing signal producing circuit so as to successively feed, by such shift pulses, the data characters stored in the memory circuit from the lowermost register to an output control circuit. In the output control circuit, output gates of oscillators, having oscillation frequencies set in accord with the weight of the 8-4-2-1 code, are controlled by the state of the bits of data characters from various registers of the memory circuit or by whether the bits represent 1 or 0, so that the data characters can be recorded, in synchronism with the synchronizing signals from the synchronizing signal producing circuit, on the magnetic tape of the magnetic tape recorder in the form of signal pulses having mixed frequencies in accord with the numbers of each character.

Another objective of the invention is to provide a data encoder device in which space signals are automatically recorded on a magnetic tape when no data characters are fed from some registers of the memory circuit to the output control circuit because of the fact that the number of data characters in block units encoded by depressing the keys of the keyboard or the number of registers storing the data characters therein is smaller that the memory capacity of the memory circuit and some registers are empty of data characters.

It will be evident that, when data is recorded in a block unit on a magnetic tape, difficulties will be faced within effecting synchronized control of the decoder and troubles are caused if no space signals are recorded on the magnetic tape when no data characters are fed to the output control circuit from some registers. For example, if data of one block having a smaller a number of characters to be recorded or number of registers smaller than normal is recorded as it is, or if data of one block having three loaded registers and five empty registers is recorded, only three characters will be recorded in a space sufficiently large to accommodate eight characters, and the characters of the next following block will be recorded while the space on the tape corresponding to the five characters of the preceding block remains empty. It will be evident that it is impossible to effect synchronized control of the decoder when such recorded data is reproduced and decoded.

In order to obviate this problem, it has hitherto been customary to store space signals in the registers of the memory circuit which contain no data characters by depressing the keyboard key for space characters, so that the space signals can be recorded in the space on the magnetic tape which would otherwise carry no recording. This invention obviates the aforementioned problem by the feature which permits automatically to feed space signals to the output gates from the output control circuit so that they may be recorded on the magnetic tape when no data characters are fed from some registers of the memory circuit, thereby eliminating the need to dpress the keyboard space key in the keyboard for feeding space signals.

Another objective of the invention is to provide a data encoder device whose electric circuits are simplified in construction by virtue of the feature that clock pulses of the synchronizing signal producing circuit supplied to the memory circuit are utilized for effecting control of the timing of the initiation of tape movement and the initiation of data feed so that an allowance may be made for the time interval required for the tape speed to reach its normal level while securing a control space or interrecord gap (IRG) between the blocks of data to be recorded on the magnetic tape. It has hitherto been customary to use a timing gate circuit or the like to attain this end. This invention obviates the use of such additional circuit, thereby permitting to obtain an overall compact size in a data encoding device and reduce cost.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF A PREFERRED EMBODIMENT

Figure 1A:
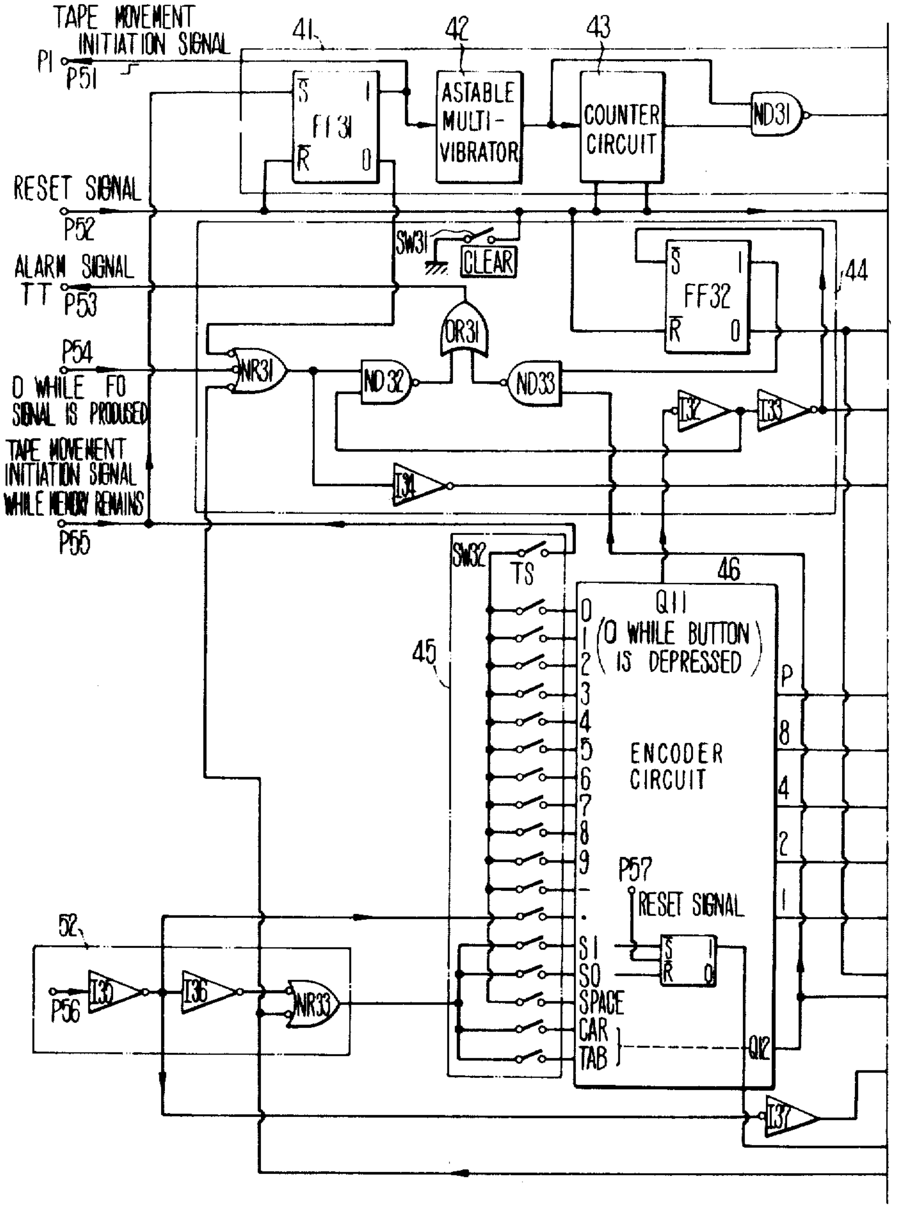
FIG. 1A is a left half portion of a block diagram of electric circuits comprising one embodiment of the encoder device according to this invention.
Figure 1B:
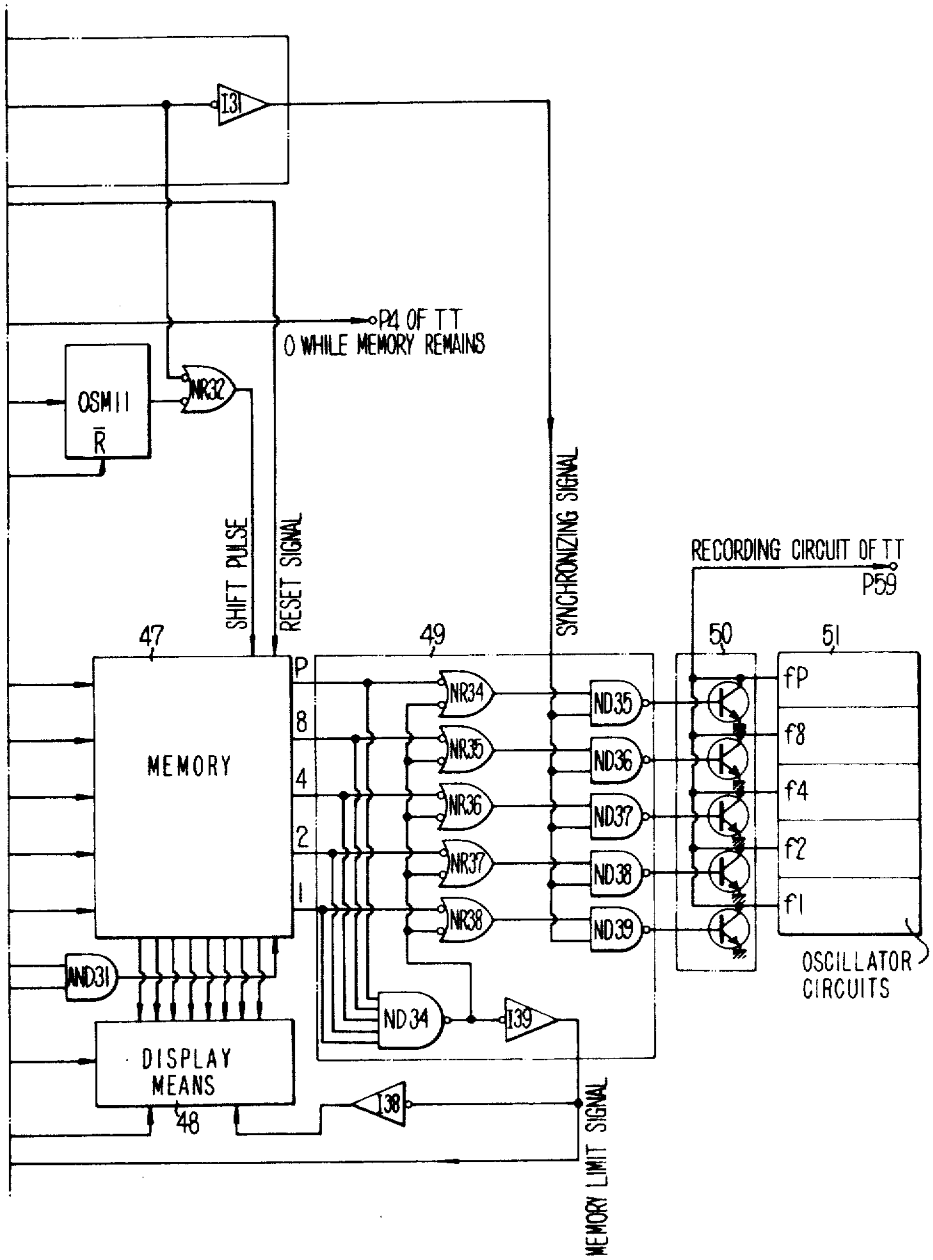
FIG. 1B is a right half portion of the block diagram of FIG. 1A.

In FIGS. 1A and 1B, a synchronizing signal producing circuit 41 is shown as comprising an astable multivibrator 42 producing clock pulses as its output signals and adapted to have its operation controlled by a flip-flop FF31, and a counter circuit 43 adapted to count the clock pulses and supply eight clock pulses or the sixth to thirteenth clock pulses produced to a memory circuit 47 and an output control circuit 49 subsequently to be described as synchronizing signal pulses, and shift pulses respectively. The reason why eight clock pulses are used as synchronizing pulses and shift pulses is because the maximum number of data characters in each block to be stored in memory circuit 47 is set at eight.

As aforementioned, counter circuit 43 operates such that the sixth to thirteenth clock pulses are taken out as its output signals but the first to fifth clock pulses are not taken out after it has started counting the clock pulses. This manner of operation of counter circuit 43 is a characteristic feature of this invention which permits to achive the following result. The feature provides a time interval corresponding to the duration of five pulse clocks after multivibrator 42 begins to produce pulse clocks simultaneously as a tape movement initiation signal is produced and before shift pulses are taken out from counter circuit 43 as its output signals. Assuming that the duration of each clock pulse is 0.1 second, 0.5 second will elapse before the first shift pulse is produced from counter circuit 43 after the movement of the magnetic tape is initiated. This permits to secure a control space between the adjacent blocks of data to be recorded on the magnetic tape and at the same time to allow for the speed of tape movement to reach its normal level.

Figure 2:
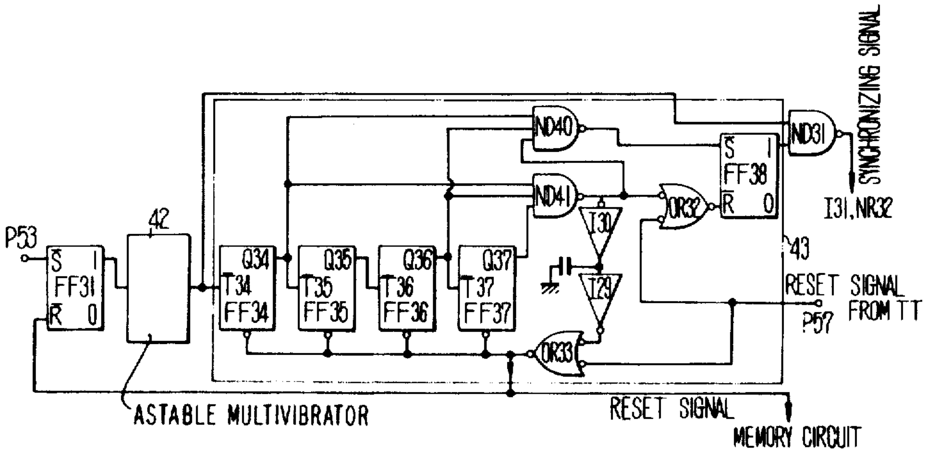
FIG. 2 is an electric circuit diagram comprising one embodiment of the synchronizing signal producing circuit of the decoder device according to this invention.

The construction of counter circuit 4, whose operation is a characteristic feature of this invention, is shown in FIG. 2 wherein counter circuit 43 is shown as comprising trigger flip-flops FF34 to FF37 arranged in four stages for counting the number of clock pulses. Output signals of an output terminal Q34 of first stage flip-flop FF34, an output terminal Q36 of third stage flip-flop FF36 and an output terminal Q37 of fourth stage flip-flop FF37 are supplied to a NAND gate ND41 so that the latter may produce an output signal. A decay signal appearing at the output of NAND gate ND41 is transmitted through an OR gate OR32 to a flip-flop FF38 to reset the same and close a NAND gate ND31. At the same time, the decay signal is transmitted through inverters I130 and I29 and an OR gate OR33 to flip-flops FF34 to FF37 as well as to flip-flop FF31 at the input terminal of circuit 41, so as to reset these flip-flops and render multivibrator 42 inoperative.

On the other hand, output signals appearing at output terminals Q34 and Q36 and NAND gate ND41 are supplied to a NAND gate ND40 so that the latter may produce an output signal. A decay signal appearing at the output of NAND gate ND40 is supplied to flip-flop FF38 to set the same, so that NAND gate ND 31 is opened and permits to take out clock pulses from counter circuit 43.

Figure 3:
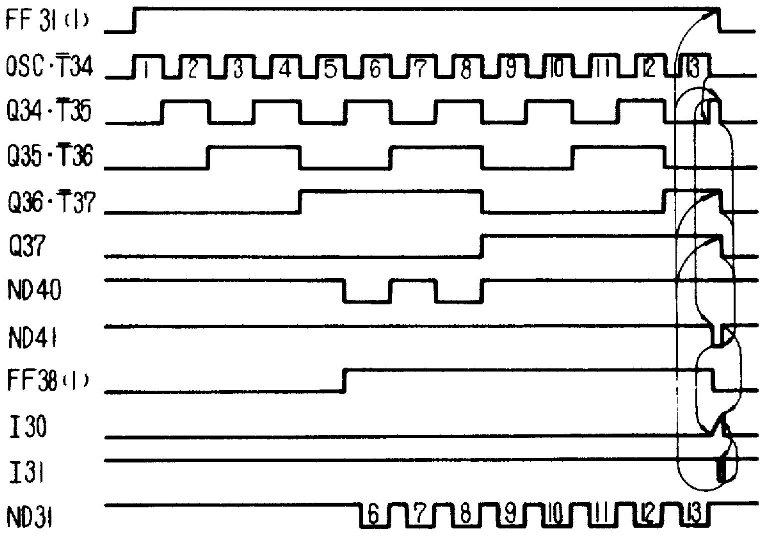
FIG. 3 shows wave forms of output signals of various circuits of the synchronizing signal producing circuit shown in FIG. 2.

As is clear from the output wave forms shown in FIG. 3, it is only after the fifth clock pulse from multivibrator 42 shows a decay that a decay signal appears at the output of NAND gate ND40. Thus, the sixth and following clock pulses are taken out through NAND gate ND31. Then, after the thirteenth clock pulse shows a decay, a decay signal appears at NAND gate ND41 to reset flip-flop FF38 and close NAND gate ND31. At the same time, multivibrator 42 is rendered inoperative.

It will be evident that the decoder device according to this invention permits to utilize clock pulses of the synchronizing signal producing circuit to effect control of timing of the initiation of magnetic tape movement and the initiation of recording of data on the magnetic tape without the need of using an additional timing gate circuit or the like. This is conductive to reduce the size and production cost of the encoder device.

Returning to FIG. 1, 44 is an alarm signal producing circuit for producing an alarm signal which is supplied through an OR gate OR31 and a terminal P53 to a magnetic tape recorder TT to produce a buzzing sound as a warning. When such alarm signal is produced will be explained in the description of operation. 45 designates a keyboard for encoding data by depressing keys and comprising keys for numbers (0 to 9), decimal point ( . ), shift in (SI), shift out (SO), space signals (SPACE), carriage return (CAR), line feed and tabulation (TAB).

46 denotes an encoder circuit for encoding numbers or instruction words fed to the device by depressing keys on keyboard 45. In the embodiment shown and described herein, such numbers representing data to be recorded or instruction words are encoded into binary digits of a code P-8-4-2-1 which consists of an ordinary binary code of 8-4-2-1 and a parity bit P, for effecting parity check, added to it. Encoder circuit 46 may, for example, be a diode matrix circuit. Of the instruction words referred to above, signals of carriage return, line feed and tabulation are encoded by another encoder circuit 53 shown in FIG. 4 as subsequently to be described.

Figure 4:
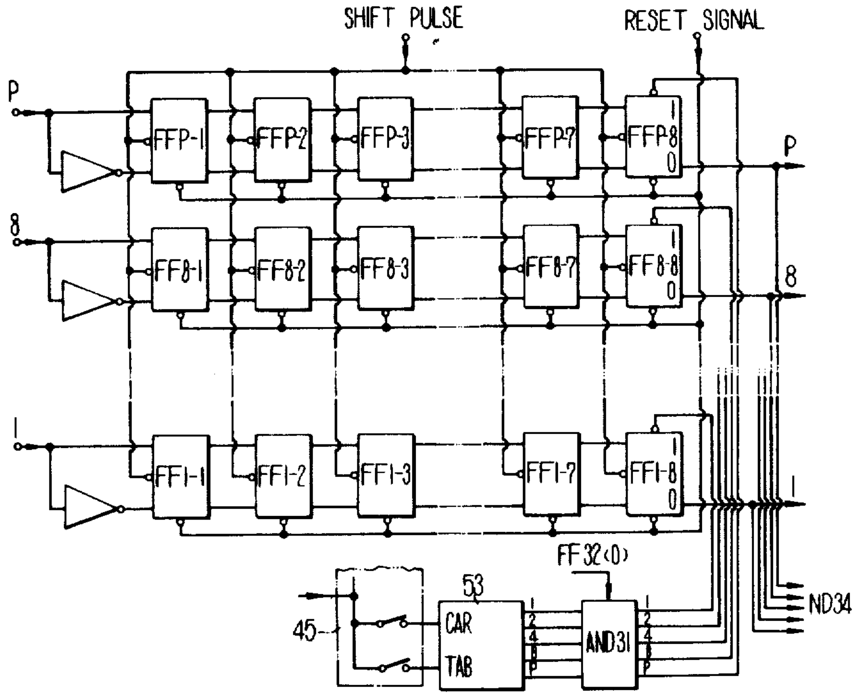
FIG. 4 is an electric circuit diagram comprising one embodiment of the memory circuit of the encoder device according to this invention.

47 is the memory circuit described above in which data characters encoded into binary digits by encoder circuit 46 are stored in a block unit. In this embodiment, one block comprises eight data characters, so that memory circuit 47 comprises shift registers of the serial signal type each comprising eight trigger flip-flops for each bit of the P-8-4-2-1 code as shown in FIG. 4. When a data character signal is fed by encoder circuit 46 to memory circuit 47, it is stored in the leftmost register by a shift pulse and shifted rightwardly by one stage each time a shift pulse is received. The shift pulses are taken out by a one shot multivibrator OSM11. That is, a decay signal appears at the output of a terminal Q11 of encoder circuit 46 each time one of the keys on keyboard 45 is depressed, and such decay signal is supplied to one shot multivibrator OSM11 as its input through inverters I32 and I33. This causes one shot multivibrator OSM11 to produce an output signal which is supplied through a NOR gate NR32 to memory circuit 47 as a shift pulse. It will be needless to explain here in detail that shift pulses for taking out data characters stored in memory circuit 47 are supplied from the aforesaid synchronizing signal producing circuit 41.

48 designates a display means for indicating the contents of the data stored in memory circuit 47. Besides indicating the contents of the memory circuit, the display means also indicates the the memory circuit is full to its memory capacity, whether shift in or shift out is effected, and whether it is possible to feed data to the encoder device by depressing keys of the keyboard.

49 is the output control circuit which is one of the characterizing features of this invention and comprises five NOR gates NR34 to NR38 connected at one of their input terminals to output terminals of the registers for the bits of P-8-4-2-1 code of memory circuit 47, a NAND gate ND34 simultaneously receiving output signals from the registers for the bits of P-8-4-2-1 code as its inputs and supplying its output signal to the other input terminal of each of the NOR gates NR34 to NR38, and five NAND gates ND35 to ND39 receiving output signals of NOR gates NR34 to NR38 as one of their inputs and a synchronizing signal from synchronizing signal producing circuit 41 as the other input thereof. According to this invention, an output gate means 50 of an oscillator circuit 51 comprising oscillators having oscillation frequencies set in accord with the weight of the code P-8-4-2-1 is controlled by the state of output (whether it is 1 or 0) of NAND gates ND35 to ND39.

Each gate of output gate means 50 may, for example, be an NPN type transistor with its emitter being grounded. The base of the transistors are connected to the outputs of the respective NAND gates ND35 to ND39, and the collectors are connected to the outputs of the respective oscillator circuits 51. At the same time, the collectors of the transistors are connected to one another through a series circuit of a resistor of high value and a capacitor (not shown), so that output gates means 50 is connected to a recording circuit of a magnetic tape recorder TT through an output terminal P59.

Oscillation frequencies of the oscillators of oscillator circuit 51 are set in accord with the weight of P-8-4-2-1 so that $fP$=1615Hz, $f8$=1,445Hz, $f4$=1,275Hz, $f2$=1,105Hz and $f1$=935Hz. Thus, if the data character stored in the rightmost registers of memory circut 47 is 3 in decimal notation, it is stored in the form of binary digits (10011) in conformity with the P-8-4-2-1 code. If this data character is fed by a shift pulse to output control circuit 49, the binary digits (10011) will be fed in the form (01100) because the output of memory circuit 47 is taken out from the 0 side output terminals of the rightmost register of the circuit as shown in FIG. 4.

The NOR gates NR34, NR37 and NR38 receive signals representing 0, and a rise signal appears at the output of each of such NOR gates and is supplied to NAND gates ND35, ND38 and ND39 as one of their inputs. At this time, a synchronizing signal pulse is supplied to such NAND gates so that a decay signal appears at the output of each of such NAND gates. Thus, those transistors of output gate means 50 which are connected to NAND gates ND35, ND38 and ND39 are turned off, so that the oscillation outputs $fP$, $f2$ and $f1$ of the oscillators which are connected to such transistors are fed through a common output terminal and terminal 59 to the magnetic tape recorder as a signal of mixed frequencies of $fP$, i f2 and $f1$.

The NOR gates NR35 and NR36 receive signals representing 1, and a decay signal appears at the output of each of such gates, so that a decay signal also appears at the output of each of the NAND gates ND36 and ND37 corresponding to the NOR gates NR35 and NR36, respectively, and turns on each of the corresponding transistors of output gate means 50. Thus, the oscillation outputs $f8$ and $f4$ of the oscillators connected to such transistors are grounded and do not appear at their output terminals.

From the foregoing description, it will be appreciated that according to this invention, a data character is stored in the registers of memory circuit 47 in binary digits of the P-8-4-2-1 code, and the code bits 1 (or 0) alone are taken out from the memory circuit to form a signal of mixed frequencies comprising frequencies set in accord with the weight of the code of P-8-4-2-1. Such signal of mixed frequencies is recorded on the magnetic tape as a signal synchronous with a synchronizing signal.

Output signals (data character signals) taken out from memory circuit 47 are introduced into NAND gate ND34, too, to which all such signals are supplied as its inputs simultaneously. However, if there is a signal representing 0 in these output signals, a rise signal appears at the output terminal of NAND gate ND34 which does not affect NOR gates NR34 to NR38.

In case any one block comprises only four data characters, for example, in spite of the fact that the memory capacity of memory circuit 47 is eight data characters for each block, data signals will be stored in four registers beginning with the leftmost register but the rest of the registers or four registers will remain empty and remain in the state of being reset. If a shift pulse is applied to memory circuit 47 in this state, a signal (11111) will be taken out at the output terminal of each of the empty registers. When such signal (11111) is supplied directly to NOR gates NR34 to NR38 as their inputs, a decay signal appears at the output terminal of each of such NOR gates. The (11111) signal is also supplied to NAND gate ND34 as its input, and causes a decay signal to appear at the output terminal of NAND gate ND34 which decay signal causes rise signals to appear at the output terminals of all the NOR gates NR34 to NR38.

The rise signals appearing at the output terminals of NOR gates NR34 to NR38 and a synchronizing signal are simultaneously transmitted to NAND gates ND35 to ND 39 and cause decay signals to appear at the output terminals of all the NAND gates ND35 to ND39, thereby turning off all the transistors of output gate means 50. Thus, the frequency outputs $fP$, $f8$, $f4$, $f2$ and $f1$ of all the oscillators of oscillator circuit 51 in accord with the weights of the code of P-8-4-2-1 appear at the output terminals of output gate means 50 and are supplied as a space signal of mixed frequencies to the magnetic tape recorder.

It will thus be evident that when input data characters of any one block are less than right in number, it is not required to supply a space signal (11111) by depressing a key of the keyboard to the magnetic tape recorder when no data character signals are taken out from empty registers of the memory circuit. According to this invention, a space signal is automatically formed by output control circuit 49 and encoded as a space signal of mixed frequencies of all the frequencies $fP$, $f8$, $f4$, $f2$ and $f1$ which is recorded on the magnetic tape.

When it is desired to record any one block of data characters on the magnetic tape with any number of spaces being disposed between certain data characters and to print such one block with a desired number of spaces therein, one has only to depress the space signal key of keyboard 45 so as to store a space signal (11111) in each of the registers corresponding to the spaces to be taken on the magnetic tape.

In the embodiment shown and described herein, the output signal of NANd gate ND34 is applied to all the NOR gates NR34 to NR38 because the space signal (11111) is employed. It will be evident, however, that a NOR gate or gates to which the output of NAND gate ND34 is applied may vary depending on what space signal is selected. For example, if a space signal (10000) in binary code form is used, the output of NAND gate ND34 will have only to be applied to NOR gate NR34.

A space signal (00000) in binary code form will appear at the output terminals of memory circuit 47 when the space signal key on the keyboard is depressed, so that rise signals appear at the outputs of all the NOR gates NR34 to NR38. Thus, the aforementioned process will be repeated to supply a space signal of mixed frequencies of $fP$, $f8$, $f4$, $f2$ and $f1$ to the magnetic tape recorder. In FIGS. 1A and 1B, 52 is a keying prevention circuit for preventing inadvertent keying when recording is being carried out through a microphone of the magnetic tape recorder. If a microphone jack is inserted in the magnetic tape recorder to perform recording through a microphone, a signal representing 0 will be introduced from the magnetic tape recorder into a terminal P56 and cause the input terminals of all the keys of keyboard 45 to produce a signal representing 1 through inverters I35 and I36 and a NOR gate NR33. Thus, inadvertent keying is precluded when recording is being carried out through a microphone because no output is produced from encoder circuit 46 even if keying is performed with the input terminals of the keys producing a signal representing 1. A signal representing 1 is applied to terminal P56 when no microphone jack is inserted in the magnetic tape recorder, and keying is possible because the input terminals of the keys produce a signal representing 0.

As aforementioned, instruction words for carriage return, line feed and tabulation are converted into binary digits by encoder circuit 53 shown in FIG. 4 which is provided in encoder circuit 46, and the instruction word in binary code form is directly stored in the rightmost register of memory circuit 47 through one input terminal of an AND gate AND31. However, when other data characters are stored in memory circuit 47, a signal representing 0 is applied to the other input terminal of AND gate AND31, so that the gate is not opened and the instruction word in binary code form is not stored in memory circuit 47.

More specifically, even if the number of data characters stored in memory circuit 47 is only one, a decay signal appearing at the terminal Q11 of encoder circuit 46 when such data character is introduced into memory circuit 47 sets a flip-flop FF32 through inverters I32 and I33 and causes a decay signal to appear at an output terminal of flip-flop FF32 on the 0 side thereof, so that AND gate AND31 remains closed because the output of flip-flop FF34 is one of the inputs of AND gate AND31.

If all the data characters in memory circuit 47 are taken out therefrom, a reset signal will be applied to flip-flop FF32 from counter circuit 43 to reset the same and cause a rise signal to appear at its output on the 0 side, thereby permitting to store an instruction word, such as carriage return, line feed or tabulation, in memory circuit 47.

On the other hand, even if a key on the keyboard is depressed to introduce another data character into memory circuit 47 and store the same therein after a carriage return or tabulation signal is stored in the rightmost register of memory circuit 47, it will not be possible to store such data character in the memory circuit, because no shift pulse is produced by one shot multivibrator OSM11. More specifically, if a carriage return signal in binary code form of (01101) or a tabulation signal in binary code form of (11100), for example, is stored in the rightmost register in memory circuit 47, a reverse signal (10010) or (00011) will be produced in every output terminal of the rightmost register of memory circuit 47, so that a decay signal appearing at the output terminal of NAND gate ND34, to which all the outputs of the rightmost register are applied simultaneously, is converted into a rise signal. This rise signal is passed through an inverter I39, NOR gate NR31 and inverter I34 and applied in the form of a decay signal, to a reset terminal of one shot multivibrator OSM11.

Thus, a rise signal is produced at the output of NAND gate ND34 till the carriage return or tabulation signal stored in memory circuit 47 is fed to output control circuit 49 by a shift pulse. Therefore, even if another data character is encoded by encoder circuit 46 by depressing a key on the keyboard while the rise signal is produced at the output of NAND gate ND34 a shift pulse will not be produced because one shot multivibrator OSM11 remains in set position, so that such data character in code form cannot be stored in memory circuit 47.

According to this invention, a carriage return, line feed or tabulation signal is directly introduced and stored in the rightmost register of memory circuit 47, and it is not possible to store other data characters in memory circuit 47 if the aforementioned instructions signal is already stored therein as aforementioned. Conversely, if any data character is stored in memory circuit 47, then it is not possible to store a carriage return, line feed or tabulation signals until the data character stored in memory circuit 47 is taken out. The feature described above is provided to obviate the problem of how to prevent the next following block of data characters from being introduced into the typewriter while the operation of carriage return, line feed or skipping to a tab-set position is being performed, because it takes time for the aforesaid operation to be performed.

If a carriage return, line feed or tabulation signal is recorded on the magnetic tape by the aforementioned process a time interval, comprising at least a time interval corresponding to seven characters of one block except for the carriage return, line feed or tabulation signal and 0.4 second for the tape movement to reach its normal level, will elapse after such instruction is read out. It will thus be possible to permit the operation of carriage return, line feed or skipping to the tab-set position to be performed satisfactorily before the data characters of the next following block are reproduced and read out.

The construction and function of the principal circuits of the encoder device according to this invention have been described. Now, the operation of the decoder device as a whole will be described. The encoder device CO according to this invention is connected to the magnetic tape recorder TT shown fragmentarily in FIG. 5. Depression of a recording button (REC) of the latter supplies power to magnetic tape recorder TT and encoder device CO and at the same time causes a reset circuit 7 to supply a reset signal to a terminal P52 shown in FIG. 1, so that the flip-flop FF31 of synchronizing signal producing circuit 41, counter circuit 43, flip-flop FF32 and memory circuit 47 are reset.

Now, the keys on keyboard 45 are operated to feed data characters of one block to the encoder device CO. Each character is encoded by encoder circuit 46 into binary digits, and at the same time a decay signal is produced at the terminal Q11 of encoder circuit 46 each time keying is performed which decay signal is supplied through inverters I32 and I33 to one shot multivibrator OSM11 as its input. One shot multivibrator OSM11 produces negative pulses which are supplied through NOR GATE NR32 to the memory circuit as shift pulses. Thus, the data characters in binary code form are successively stored in the registers of memory circuit 47.

When the number of data characters stored in memory circuit 47 reaches eight, which is the memory capacity, the first character originally stored in the leftmost register of memory circuit 47 is now shifted to the rightmost register, so that a signal representing 0 appears at every one of the outputs of the rightmost register. This causes a rise signal to appear at the output terminal of NAND gate ND34 into which all the outputs of the rightmost register are introduced simultaneously as its inputs. This rise signal functions as a memory limit signal which is transmitted through inverter I39, NOR gate NR31 and inverter I34 to one shot multivibrator OSM11 to reset the same. Thus, further keying produces no shift pulses from one shot multivibrator OSM11, thereby precluding storing of additional data in memory circuit 47. Besides, the memory limit signal causes a rise signal to appear at the output terminal of NOR gate NR31, and keying of additional data over and beyond the memory capacity causes a decay signal to appear at the terminal Q11 of encoder circuit 46 which decay signal causes a rise signal to appear at inverter I32. These two rise signals are simultaneously supplied to a NAND gate ND32 and cause a rise signal to appear at the output of NAND gate ND32. This rise signal is supplied through OR gate OR31 to the magnetic tape recorder as an alarm signal which produces a buzzing bound through its speaker.

If a tape start key TS on keyboard 45 is depressed after the data characters of one block are stored in binary digit form in memory circuit 47 as aforesaid, then a switch SW32 is closed and a set signal is supplied to the flip-flop FF31 of synchronizing signal producing circuit 41. This causes clock pulses to be produced at a cycle of 0.1 second from astable multivibrator 42 to counter circuit 43. At the same time, a rise signal appearing at the output terminal on the 1 side of flip-flop FF31 is supplied to a terminal PI of the magnetic tape recorder shown in FIG. 1 as a tape start signal, thereby initiating tape movement.

When 0.5 second has elapsed after initiation of tape movement, counter circuit 43 counts the sixth clock pulse from astable multivibrator 42 and the sixth to thirteenth clock pulses are supplied to NAND gate ND31. These clock pulses and the clock pulses directly supplied from astable multivibrator 42 are supplied simultaneously as inputs to NAND gate ND31 whose outputs are supplied as shift pulses to memory circuit 47 and at the same time supplied to output control circuit 49 through inverter I31 as synchronizing signal pulses.

Thus, the data characters of one block stored in memory circuit 47 are successively fed to output control circuit 49 by the aforesaid eight shift pulses. Output control circuit 49 controls the gate means 50 of oscillator circuit 51 by the aforementioned control function in accord with the state of output of each of NAND gates ND35 to ND39 to which the synchronizing signal pulses are supplied, so that the data characters of one block are fed as signal pulses of mixed frequencies corresponding to the state of bits of the characters to the recording circuit of the magnetic tape recorder through terminal P59 to be recorded on the magnetic tape. The time interval required for the data characters of one block to be recorded is 0.8 second or equal to the time in which eight clock pulses are produced at a cycle of 0.1 second.

Upon completion of feeding of eight clock pulses from counter circuit 43, a reset signal is produced in counter circuit 43 so that not only the counter circuit itself but also flip-flop FF31 is reset as aforementioned, thereby rendering astable multivibrator 42 inoperative and causing a decay signal to appear at the output terminal on the 1 side of flip-flop FF31. This interrupts tape movement. Memory circuit 47 is also reset and cleared thereby.

If keying and depression of tape start button TS are repeated with reference to data characters of the second, third ..... and *n*th blocks, the aforementioned cycle of operation will be repeated, so that the data characters of as many blocks as desired can be successively recorded in binary digit form on the magnetic tape.

As aforesaid, no data character is stored in memory circuit 47, even if a data character is fed by keying to the decoder device CO, immediately following the keying of an instruction word, such as carriage return, line feed or tabulation. If a data character is inadvertently fed by keying, a decay signal will appear at terminal Q11 and cause a rise signal to appear at the output terminal of inverter I32. The storing of a carriage return, line feed or tabulation signal in the rightmost register of memory circuit 47 causes a decay signal to appear at NAND gate ND34 which decay signal causes a rise signal to appear at NAND gate ND31. These two rise signals are supplied simultaneously to NAND gate ND32 as its inputs and cause the same to produce a decay output signal which is transmitted through OR gate OR31 to the magnetic tape recorder to that it may produce an alarm signal through the speaker.

Conversely, if an attempt is made to inadvertently feed an instruction word to the decoder device CO by keying when data characters of one block are stored in memory circuit 47, AND gate AND31 will not open because a decay signal is produced at the output terminal on the 0 side of flip-flop FF32, so that it is not possible to store such instruction word in memory circuit 47 as aforementioned. Keying of a data character produces a decay signal at terminal Q11 which is transmitted through inverters I32 and I33 to flip-flop FF32 to set and cause the same to produce a rise output signal at its output terminal on the 0 side. Keying of an instruction word produces a rise output signal at a terminal Q12. These two rise signals are supplied to a NAND gate ND33 to cauye the same to produce a decay output signal which is transmitted through OR gate OR31 to the magnetic tape recorder so that it may produce an alarm signal.

If a stop button of magnetic tape recorder TT is depressed after keying of the data characters of all the blocks to be recorded is completed, the magnetic tape recorder will perform a required data recording termination operation and then the magnetic tape recorder and encoder device will be cut off from the power source.

Operation of the encoder device CO according to this invention will be described in conjunction with operation of a tape transport and control circuit of magnetic tape recorder TT shown in FIG. 5. As aforementioned, depression of recording button REC of magnetic tape recorder TT supplies power to the magnetic tape recorder and encoder device through the action of relays (not shown) so as to cause a magnetic tape drive motor to rotate. At the saem time, a reset signal RO, is produced by a reset circuit 7 which is rendered operative when the tape recorder is electrically connected to its power source. This reset signal RO which represents 0 for the first 1 second and then represents 1 thereafter, is supplied to the terminal P52 of the encoder device as aforementioned. The 0 portion of reset signal RO causes a NOR gate NR6 to produce a rise output signal which is supplied through a plunger drive circuit PD3 to a plunger PL3, so that a plunger PL3 is rendered operative for 1 second during which the signal RO represents 0.

Plunger PL3 is a release plunger for interrupting tape movement. Plunger PL3 is temporarily actuated when power is supplied to the magnetic tape recorder and then rerendered inoperative to the ready for emergency.

Depression of REC button also moves a switch SW1 from a terminal *a* to a terminal *b* to thereby set and cause a flip-flop FF2 to produce a rise output signal at its output terminal on the 1 side which signal is supplied to an AND gate AND1 as its one input. On the other hand, a flip-flop FF1 reset 1 second after depression of the REC button causes a NOR gate NR1 to produce a rise output signal. Conversion of reset signal RO to 1 and a production of a rise signal at terminal a cause a NOR gate NR2 to produce a rise signal output, through an inverter I2. These two rise output signals cause a NAND gate ND1 to produce a rise output signal which is transmitted through a NOR gate NR3, inverter I8 and one shot multivibrator OSM1 to AND gate AND1 as the other input thereto. This renders a normal direction tape travel plunger PL1 operative through a plunger drive circuit PD1, thereby initiating tape movement.

Conversion of reset signal RO from 0 to 1 also renders a timing gate circuit 1 operative. After 1 second has elapsed since initiation of operation of circuit 1, a rise signal is produced for 2 seconds at an output terminal *e* and introduced into an inverter I9 through an OR gate OR2. This causes a decay signal to appear at the output terminal of inverter I9 which signal turns off a transistor TR1. Thus, an oscillation output *fo* of a 2 second oscillator 2 is fed to a recording amplifier circuit, so that a recording time control signal *fo* (hereinafter referred to as an *fo* signal) is recorded on the tape.

A decay signal is produced at the output terminal *e* when the rise signal disappears 3 seconds after its appearance. This decay signal sets flip-flop FF1 so that release plunger PL3 is rendered operative through NOR gate NR1, NAND gate ND1, NAND gate ND2, NOR gate NR5, inverter I10, one shot multivibrator OSM2, NOR gate NR6 and plunger drive circuit PD3, thereby interrupting tape movement.

Teh decay signal produced at the output terminal *e* of timing gate circuit 1 3 seconds after initiation of operation is transmitted through an inverter I11 to a NOR gate NR8 to cause the same to produce a decay output signal, thereby interrupting the operation of circuit 1. Thus, *fo* signal is recorded for 2 seconds on the magnetic tape after 1 second has elapsed following initiation of tape movement. Following recording of *fo* signal, tape movement is temporarily interrupted.

Figure 5A:
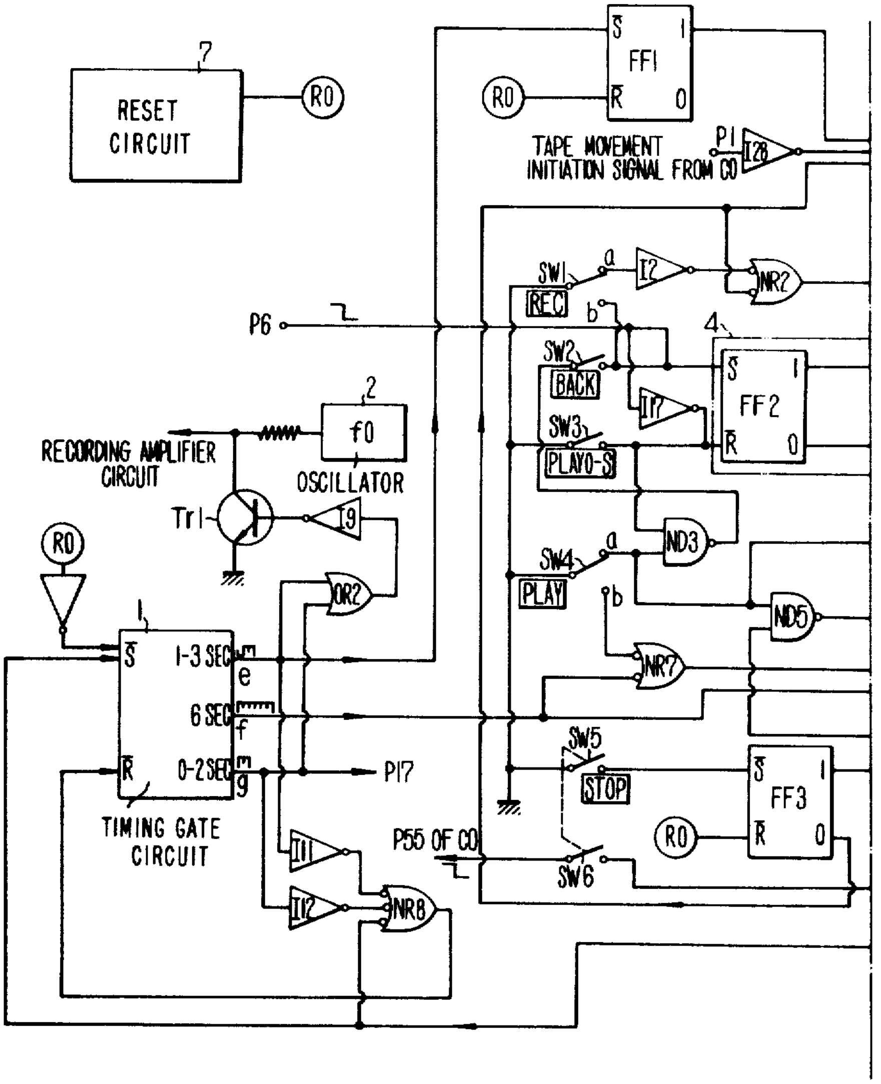
FIG. 5A is a left half portion of an electric circuit block diagram comprising one embodiment of the tape advance control circuit of the magnetic tape recorder connected to the encoder device according to this invention.
Figure 5B:
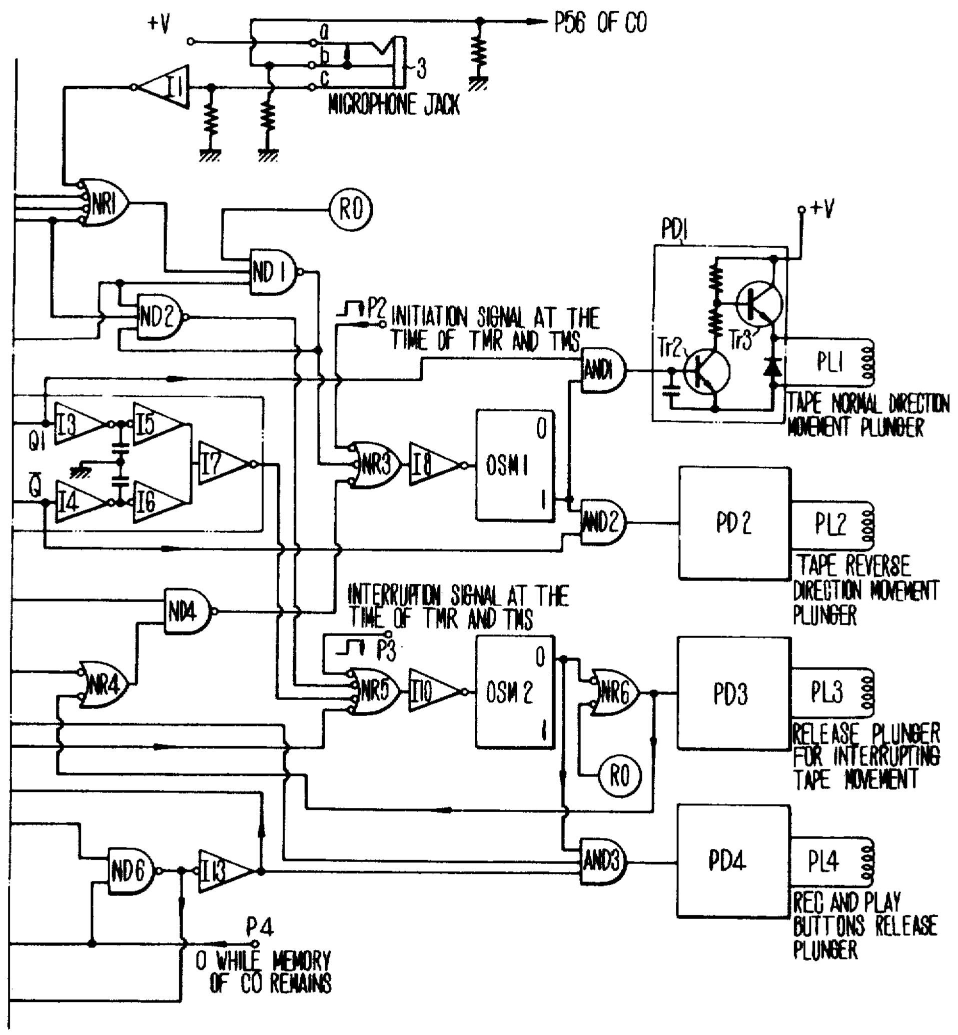
FIG. 5B is a right half portion of the block diagram of FIG. 5A.
Figure 6:
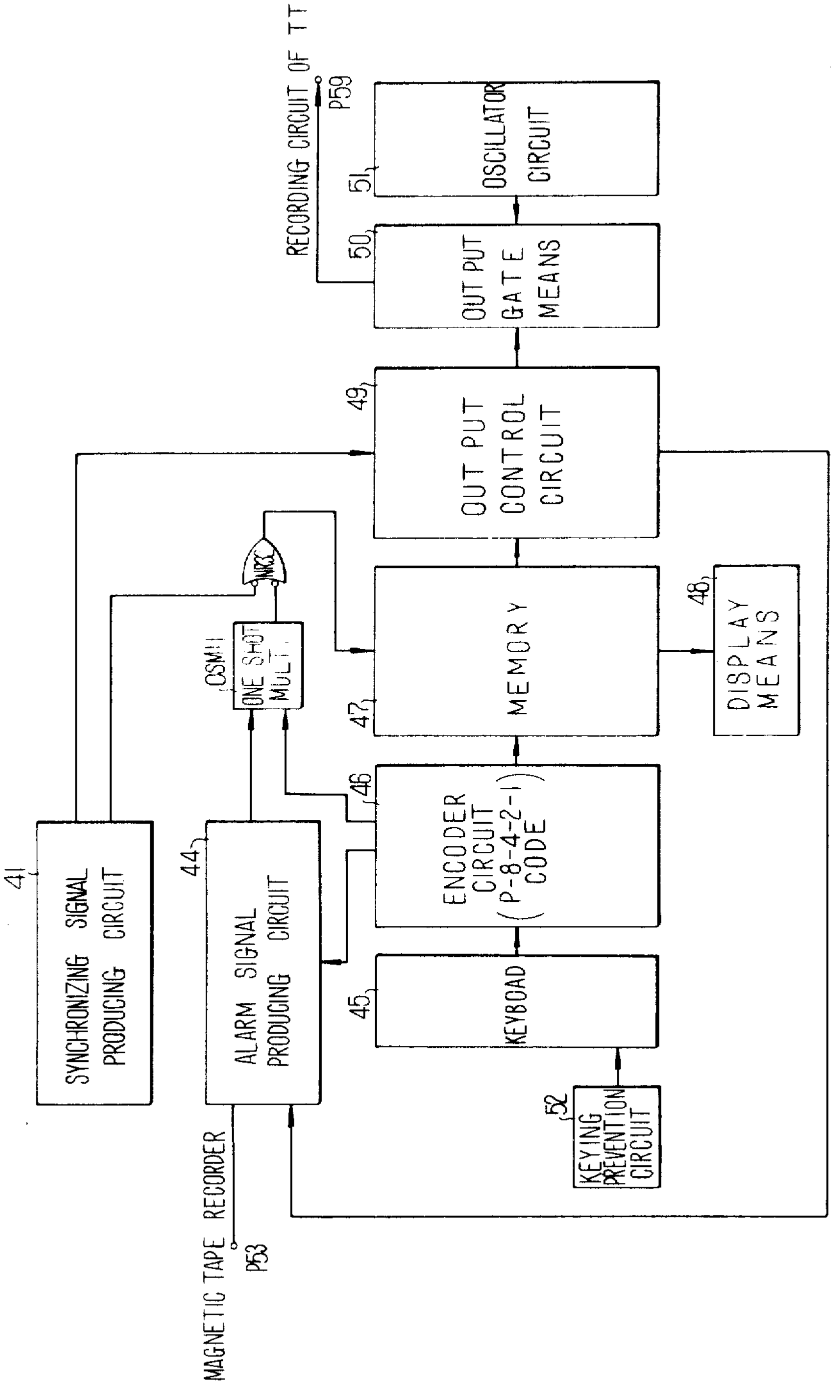
FIG. 6 is a block diagram of the complete system of the invention.

If data characters are fed block by block to encoder device CO by keying and tape start key TS is depressed at this time as aforementioned, a rise signal will be supplied from a terminal P51 of encoder device CO to the terminal P1 shown in FIG. 5 and transmitted through an inverter I28, NOR gate NR1, NAND gate ND1, NOR gate NR3, inverter I8, one shot multivibrator OSM1, AND gate AND1 and plunger drive circuit PD1 to a tape normal direction movement plunger PL1 to render the same operative for starting tape movement again. After 0.5 second has elapsed following starting of tape movement, data characters of one block are recorded on the magnetic tape in binary digit form as encoded by the encoder circuit.

When recording carried out for 0.8 second is completed and the flip-flop FF31 of FIG. 1 is reset, a decay output signal is produced at the terminal P1 of FIG. 5 through terminal P51 and transmitted through inverter I28, NOR gate NR1, NAND gate ND1, NAND gate ND2, NOR gate NR5, inverter I10, one shot multivibrator OSM2 and plunger drive circuit PD3 to release plunger PL3 to render the same operative, thereby interrupting tape movement. Thereafter, each time data characters of one block are keyed in the encoder device CO the cycle of depression of tape start key TS, starting of tape movement, recording and interruption of tape movement is repeated.

If a stop button STOP is depressed after completion of recording of all the data characters desirous of recording, a switch SW5 is actuated to set a flip-flop FF3 which produces a decay output signal at an output terminal of the 0 side. This decay output signal is transmitted through NOR gate NR1, NAND gate ND1, NOR gate NR3, inverter I8, one shot multivibrator OSM1, AND gate AND1 and plunger drive circuit PD1 to normal direction tape movement plunger PL1 to render the same operative, thereby starting tape movement.

On the other hand, a rise output signal produced at an output terminal on the 1 side of flip-flop FF3 and a rise output signal produced at a terminal P4 as the flip-flop FF32 shown in FIG. 1 is reset are supplied to a NAND gate ND6 and cause the same to produces a decay output signal which actuates timing gate circuit 1, so that a rise signal of 2 second duration is produced at the output terminal *e* thereof after 1 second has elapsed. This rise signal causes the oscillation output *fo* of oscillator 2 to be fed to recording amplifier circuit and recorded on the magnetic tape as control signal *fo* to be use when data recording is completed.

The rise signal of 2 second duration produced at the output terminal *e* is converted into a decay signal after 3 seconds have elapsed which decay signal is supplied through an inverter I11 to NOR gate NR8. At this time, the decay output signal produced at NAND gate ND6 as flip-flop FF3 is set is introduced into NOR gate NR8, so that a rise signal is continuously produced at the output of NOR gate NR8 in spite of a decay signal being supplied thereto from the output terminal *e*. Therefore, timing gate circuit 1 is not reset and continues its operation till 6 seconds elapse. When 6 seconds have elapsed, a decay output signal is produced at another output terminal *f* of timing gate circuit 1 which is constructed such that a rise signal of 6 seconds duration is produced at it following initiation of operation of circuit 1. This decay signal is transmitted through a NOR gate NR5, inverter I10, one shot multivibrator OSM2, NOR gate NR6 and plunger drive circuit PR3 to release plunger PL3 to render the same operative and interrupt tape movement.

It will thus be appreciated that when the stop button is depressed, tape movement is started and the *fo* signal is recorded for 2 seconds after 1 second has elapsed. Thereafter, tape movement is interrupted after 3 seconds have elapsed.

When release plunger PL3 is rendered operative as aforementioned or when plunger PL3 is actuated by a decay at the leading end of a negative pulse produced on the 0 side of one shot multivibrator OSM2, plunger PL3 is rendered inoperative by a rise at the trailing end of the negative pulse. At the same time, this rise causes an AND gate AND3 to produce a rise output signal which is transmitted to a plunger drive circuit 4 to render the same operative and actuate a button release plunger PL4, thereby releasing the recording button REC and restoring the same to its upper position from its lower position to which it was depressed initially.

As a result, the magnetic tape recorder is electrically disconnected from all its power sources and the tape drive motor is rendered inoperative At the same time, the encoder device is also electrically disconnected from its power sources, so that it stops functioning.

The STOP button may inadvertently be depressed in spite of the fact that part of data is still stored in the memory circuit 47 of FIG. 4. According to this invention, means is provided for automatically feeding a tape start signal to the encoder device upon depression of the STOP button, so that the aforesaid operation stop operation can be performed after all the data stored in memory circuit 47 is removed therefrom.

More specifically, when data characters are stored in the memory circuit 47 of encoder device CO, the flip-flop FF32 shown in FIG. 1 is set, and a signal representing 0 is produced at the terminal P4 shown in FIG. 5 whose input is an output on the 0 side of flip-flop FF32. Thus, even if the stop button is depressed to set flip-flop FF3 at this time, timing gate circuit 1 is not rendered operative because a rise signal is produced at the output of NAND gate ND6.

On the other hand, depression of the stop button closes a switch SW6 through a switch SW5 and permits the signal representing 0, which has been supplied from the encoder device to a terminal P4 to be transmitted to a terminal P55 of encoder device CO as a tape start signal. Thus, the flip-flop FF31 of synchronizing signal producing circuit 41 is set thereby and produces a rise signal at its output terminal on the 1 side which initiates tape movement as aforementioned, and the aforementioned operation is performed in the encoder device so that the data characters in binary digit form stored in memory circuit 47 are recorded on the magnetic tape.

Upon completion of recording of the data characters, resetting of flip-flop FF31 interrupts tape movement. Since the flip-flop FF32 of encoder device CO is also reset, a rise signal is produced at its output terminal on the 0 side so that a signal representing 1 is introduced into terminal P4. This causes a decay output signal to appear at NAND gate ND6 so as to actuate timing gate circuit 1. Thus, the aforementioned tape movement termination is performed.

The encoder device according to this invention functions as aforementioned. One of the advantages it offers is that even if there is an empty register in the memory circuit because the number of data characters is below the memory capacity of memory circuit, a apsace signal is automatically set in empty registers and fed to the output gate means, so that the need to depress the space keys a number of times corresponding to the number of empty registers is eliminated.

In the embodiment shown and described herein, memory circuit 47 is described as having its outputs taken out through output terminals on the 0 side of the rightmost register thereof. It is to be understood, however, that the outputs of memory circuqt 47 can be taken out through the output terminals on the 1 side. If this is the case, OR gates should be substituted for the NOR gates NR34 to NR38 of output control circuit 49, and an OR gate should be substituted for NAND gate ND34. If the output of this OR gate is supplied through an inverter to the OR gates replacing the NOR gates as the other input thereof, output control circuit 49 will operate in the same manner as aforementioned.

The terms TMR and TMS set forth in FIG. 5 stand for transmission receive and transmission send respectively.

A system for transmitting through a telephone circuit the data encoded by the encoder device according to this invention and recorded on a magnetic tape by a magnetic tape recorder as aforementioned is described in detail in U.S. application Ser. No. 185,959 of Oct. 4, 1971 entitled Recorded Signal Transmission System.

What we claim is:

1. An encoder device, for recording data on a magnetic tape, comprising, in combination, an encoder circuit operable to convert input data thereto into binary coded decimal numbers, said encoder circuit having parallel output terminals each respective to a different bit of the binary code; keyboard means connected to said encoder circuit and operable to supply input data thereto; a memory circuit having parallel input terminals each connected to a respective output terminal of said encoder circuit, and including registers operable to store therein, in the block unit, binary coded decimal numbers encoded by said encoder circuit, said memory circuit having parallel output terminals each respective to a different bit of the binary code; frequency generating means including a plurality of oscillators each generating a different frequency with each frequency being respective to a different bit of the binary code and having a magnitude corresponding to the relative numerical weight of the respective bit; a magnetic recording circuit having a signal input terminal; a conductor operatively associated with said frequency generating means and connected to said signal input terminal, the outputs of said oscillators being connected in parallel to said conductors; an output control circuit having parallel input terminals, each connected to a respective output terminal of said memory circuit, and having parallel output terminals each corresponding to a respective control circuit input terminal; respective output gate means each connected between an output control circuit output terminal and the output terminal of the respective oscillator having the frequency corresponding to the associated binary code bit, each output gate means controlling application of the frequency of its associated oscillator to said conductor; and pulse generating means connected to said memory circuit and to said output control circuit, and supplying shifting pulses to said memory circuit and a synchronizing signal to said output control circuit; each output gate means controlling application of the frequency of its associated oscillator to said conductor responsive to the respective bit, supplied thereto from said output control circuit, having a predetermined binary state; whereby the binary coded decimal numbers from the respective output terminals of said encoder circuit are magnetically recorded as an output signal in the form of a series of mixed frequencies each having a magnitude corresponding to a respective binary code bit.

2. An encoder device, for recording data on a magnetic tape, as claimed in claim 1, including a further gate means in said output control circuit connected to said first mentioned output gate means to condition said first mentioned output gate means and said frequency generating means to supply a "space" signal frequency to said conductor when no decimal number, in binary coded form, appears at any one of the output terminals of said memory circuit.

3. An encoder device, for recording data on a magnetic tape, as claimed in claim 2, in which said further gate means has input terminals connected to all of the output terminals of said memory circuit and output terminals connected to all of said first mentioned gate means; said further gate means simultaneously supplying respective bits having said predetermined binary state to all of said output gate means; whereby said space frequency signal is constituted by all of the oscillator frequencies.

4. An encoder device, for recording data on a magnetic tape, as claimed in claim 1, in which the shifting pulses supplied by siad pulse generating means effect delivery of binary coded decimal numbers from said memory circuit to said output control circuit; said pulse generating means comprising a multivibrator producing clock pulses responsive to movement of a magnetic recording tape of said magnetic recording circuit initiated by a tape start signal, a counter circuit connected to said multivibrator and counting the number of clock pulses produced by said multivibrator and control means included in said counter and effecting delivery of clock pulses to said memory circuit, to shift said memory circuit, only after a predetermined plurality of clock pulses have been produced by said multivibrator responsive to initiation of movement of the magnetic tape.

* * * * *